United States Patent
Klettenheimer et al.

(10) Patent No.: US 8,992,136 B2
(45) Date of Patent: Mar. 31, 2015

(54) ROTARY-DRIVEN TOOL FOR CUTTING MACHINING WITH A CUTTING BODY

(75) Inventors: Markus Klettenheimer, Albstadt (DE); Uwe Schlagenhauf, Strassberg (DE)

(73) Assignee: Guehring OHG, Albstadt (DE)

( * ) Notice: Subject to any disclaimer, the term of this patent is extended or adjusted under 35 U.S.C. 154(b) by 361 days.

(21) Appl. No.: 12/908,247

(22) Filed: Oct. 20, 2010

(65) Prior Publication Data

US 2011/0110735 A1    May 12, 2011

Related U.S. Application Data

(63) Continuation of application No. PCT/DE2009/000536, filed on Apr. 22, 2009.

(30) Foreign Application Priority Data

Apr. 25, 2008 (DE) .......................... 10 2008 020 963

(51) Int. Cl.
*B23B 51/02* (2006.01)
*B23B 51/06* (2006.01)

(52) U.S. Cl.
CPC ................ *B23B 51/02* (2013.01); *B23B 51/06* (2013.01); *B23B 2251/02* (2013.01); *Y10S 408/713* (2013.01)
USPC .............. 408/57; 408/224; 408/233; 408/713

(58) Field of Classification Search
CPC ...... B23B 51/02; B23B 51/06; B23B 2251/02
USPC ............................ 408/57, 224, 230, 233, 713
See application file for complete search history.

(56) References Cited

U.S. PATENT DOCUMENTS

| | | | | | |
|---|---|---|---|---|---|
| 5,988,953 | A | * | 11/1999 | Berglund et al. | 408/1 R |
| 6,899,495 | B2 | * | 5/2005 | Hansson et al. | 408/144 |
| 7,114,892 | B2 | * | 10/2006 | Hansson | 408/226 |
| 7,311,480 | B2 | * | 12/2007 | Heule et al. | 408/233 |
| 7,407,351 | B2 | * | 8/2008 | Pantzar et al. | 409/234 |
| 7,513,724 | B2 | * | 4/2009 | Kakai | 409/234 |
| 2002/0057951 | A1 | | 5/2002 | Silver | |
| 2003/0103824 | A1 | | 6/2003 | Hansson et al. | |
| 2005/0186042 | A1 | | 8/2005 | Hansson | |
| 2013/0259590 | A1 | * | 10/2013 | Shaheen | 408/200 |

FOREIGN PATENT DOCUMENTS

| EP | 33086 A1 * | 8/1981 | B23B 51/00 |
|---|---|---|---|
| EP | 1 310 313 A1 | 5/2003 | |

(Continued)

*Primary Examiner* — Eric A Gates
(74) *Attorney, Agent, or Firm* — Burr & Brown, PLLC

(57) ABSTRACT

A rotary-driven tool for cutting machining, in particular a drilling tool with a cutting body and a holder with a shaft piece is disclosed, with at least a cutter and a dovetail-shaped region on the cutting body and a matching dovetail recess on the holder. The cutting body can only be inserted in the holder laterally to a longitudinal axis of the holder. In order to fix the cutting body, opposing flank sections of the dovetail recess, between which the dovetail-shaped region fits can be moved over each other by means of a screw connection in the holder and on fixing the cutting body said body is subjected to a force on the axial direction by the screw connection. In one aspect, the cutting body is a cutting head and the axial force is exclusively generated by the dovetail-shaped region in cooperation with the dovetail recess in the holder.

31 Claims, 8 Drawing Sheets

(56) References Cited

FOREIGN PATENT DOCUMENTS

| EP | 1 555 075 A1 | 7/2005 | | | |
|---|---|---|---|---|---|
| EP | 1 806 195 A2 | 7/2007 | | | |
| JP | 2002113606 A | * | 4/2002 | | B32B 51/00 |
| JP | 2003291019 A | * | 10/2003 | | B23B 51/00 |
| JP | 2004255533 A | * | 9/2004 | | B23B 51/00 |
| KR | 649359 B1 | * | 11/2006 | | |
| WO | 02/34441 A1 | | 5/2002 | | |

* cited by examiner

ROTARY-DRIVEN TOOL FOR CUTTING MACHINING WITH A CUTTING BODY

CROSS-REFERENCE TO RELATED APPLICATIONS

This application is a continuation of International Application No. PCT/DE2009/000536 having an international filing date of Apr. 22, 2009, published in German on Oct. 29, 2009 under PCT Article 21(2), the entirety of which is incorporated by reference. This application claims benefit under 35 U.S.C. §119 sections (a)-(d) of German Application DE 10 2008 020 963.5, filed Apr. 25, 2008, the entirety of which is incorporated herein by reference.

FIELD OF THE INVENTIVE SUBJECT MATTER

The present inventive subject matter relates to a rotary-driven tool for cutting machining with a cutting body.

BACKGROUND

The inventive subject matter herein relates to a rotary-driven tool for cutting machining with a cutting body. In one aspect, the present inventive subject matter relates to a drilling tool for metal machining.

A drilling tool having a holder extending in the direction of a longitudinal axis is known from German Published Application DE-A1 198 34 635 A1, which has a shaft section and a head section, in which a groove running orthogonally to the longitudinal axis, in the direction of a transverse axis, is implemented. Furthermore, a cutting insert is inserted into the groove and a clamping element is provided, which penetrates a receptacle hole, which is implemented in the cutting insert, and a hole, which is implemented in at least one of the groove legs, and clamps the cutting insert against the at least one grooved leg. The central axis of the hole in the at least one grooved leg is offset in relation to the central axis of the receptacle hole in the cutting insert. The clamping element and the cutting insert form a group of components of which one component interacts via an inclined surface with the other component like a wedge surface gearing in such a manner that the cutting insert is pressed in the direction of the longitudinal axis against a first stop surface and in the direction of the transverse axis against a second stop surface in the installed state of the drilling tool. The cutting insert has an extension which extends in the direction of the longitudinal axis, and which extends into a depression implemented from the groove base surface in the direction of the longitudinal axis to the shaft section, in which the second stop surface is provided. In one embodiment according to the present inventive subject matter, the cutting insert is trapezoidal in cross-section.

BRIEF SUMMARY

The present inventive subject matter is based on the object of providing a tool of the type described above, in which the cutters may be replaced with a comparatively simpler construction.

The inventive subject matter described herein is directed to a tool for cutting machining, in particular a drilling tool for metal machining, for example, having a cutting body and a holder having a shaft part, at least one cutting edge and an area in the form of a dovetail being implemented on the cutting body and a dovetail recess matching thereto being implemented on the holder, the cutting body and the matching dovetail implementation being adapted to one another in such a manner that the cutting body can only be inserted into the holder laterally to a longitudinal axis of the holder, diametrically opposing flank sections of the dovetail recess, between which the dovetail-shaped area is intended to be situated, being movable toward one another via a screw connection in the holder to fix the cutting body, and the cutting body experiencing a force in the axial direction during the fixing through the screw connection.

In some embodiments according to the present inventive subject matter, the cutting body is a cutting head, and the force in the axial direction is exclusively provided by the dovetail-shaped area in cooperation with the dovetail recess in the holder. This procedure has the advantage that a cutting body, which is implemented like a typical drill head, for example, may be connected easily to a holder which forms the remaining drill main body. The drill geometry is thus not restricted. In particular, it is possible to implement all typical drill geometries.

In particular, the cutting body having cutting edges and clamping grooves can be produced completely typically, e.g., by grinding.

Through the positioning in the axial direction only by the dovetail geometry, it is not necessary, for example, to adapt fastening openings to one another in this orientation.

In one aspect of the present inventive subject matter, the dovetail-shaped area adjoins a frontal stop surface of the cutting body. In such an embodiment, the cutting body is preferably not positioned in the axial direction against a base of the dovetail recess, but rather only against this frontal stop. The connection point between body and holder, which thus does not move further toward the cutting edge, has the advantage of higher stability of the tool. In addition, the stop surfaces matching thereto on the holder are easily accessible, in particular for machining.

In this context, it is preferable if the dovetail-shaped area protrudes as an extension from the frontal stop surface. For example, stop surfaces are implemented on both sides of the dovetail-shaped expansion, which lie in a plane from which the extension protrudes.

With respect to the cutting body, in some embodiments according to the present inventive subject matter, the frontal stop surface is diametrically opposite to the end area of the flank sections, in particular the forwardmost frontal end area of the flank sections. Such a design may be efficiently produced and may be adapted comparatively easily to the dovetail recess in the holder.

Furthermore, in some embodiments according to the present inventive subject matter, the dovetail-shaped area adjoins the frontal stop surface in such a manner that in a state inserted into the dovetail recess, a torque during drilling is only transmitted via the dovetail-shaped area.

In some embodiments according to the present inventive subject matter, the dovetail-shaped area is adapted to the dovetail recess in such a manner that the force in the axial direction in the clamped state of the cutting body presses the frontal stop surface against one front side of each of the flank sections of the dovetail recess. A particularly rigid connection between the cutting body and the holder may thus be achieved. Before the clamping, a play may preferably exist in the axial direction in the inserted state between the stop surfaces on the cutting body and the front sides, in particular the respective forwardmost front sides of the flank sections of the dovetail recess. Upon clamping of the flank sections by the screw connection, the cutting body is drawn against the flank sections, so that the play disappears and the cutting body set presses against the flank sections, whereby defined rigid fastening of the cutting body on the holder may be achieved.

In some embodiments according to the present inventive subject matter, a recess is adapted in the dovetail area to a screw of the screw connection, which is guided in the holder, in such a manner that, in addition to location fixing by insertion of the dovetail-shaped area, centering in the insertion direction of the cutting body also occurs via the screw of the screw connection. Through this measure, with comparatively simple geometry of the connection between cutting body and holder, solely by inserting the cutting body and tightening the screw, precisely-positioned location fixing of the cutting body to the rotational axis of the holder can be achieved, which additionally has a high stability.

In some embodiments according to the present inventive subject matter, the cutting body can comprise solid carbide, in particular can entirely comprise solid carbide. In contrast thereto, the holder having shaft part can be manufactured from steel, such as HSS or tool steel. Cost optimization of the tool may thus be achieved with high wear resistance. It is also conceivable that the cutting body comprises HSS or a ceramic cutting material.

In order that the flank sections of the dovetail recess moved toward one another in the desired manner during clamping, in some embodiments according to the present inventive subject matter, a slot is implemented in the axial direction on the floor of the dovetail recess, which separates the holder into two parts in the lateral direction. It may thus also be ensured that a movement of the flank sections remains in an elastic range during clamping of the dovetail-shaped area.

In addition, in some embodiments according to the present inventive subject matter, the contour of the holder having clamping grooves essentially continues in the cutting body. Through this measure, for example, the chip removal from the cutting body in the area of the holder is also not disturbed at the connection point of cutting body and holder. Secondary cutting edges are preferably implemented on the cutting body along a clamping groove, which ensure exact guiding of the tool.

In some embodiments according to the present inventive subject matter, the recess in the dovetail-shaped area is implemented as channel-shaped. Such a design of a screw recess may be introduced comparatively easily into the dovetail-shaped area. The channel-shaped recess can be implemented as a guide channel in such a manner, for example, that lateral wall sections of the channel are adapted to a screw area of the clamping screw, so that when the screw is screwed into the holder, centering on a rotational axis occurs automatically in the insertion direction of the cutting body.

In addition, in some embodiments according to the present inventive subject matter, a cooling duct is provided in the holder, which has an opening on a front side of the holder which faces toward the cutting body. The cooling duct can run linearly or in a spiral, axially or off-center in the holder. It is also conceivable that two cooling ducts are situated in the holder, and can run in parallel and/or in a spiral. The cooling ducts may continue in the cutting body.

Furthermore, in some embodiments according to the present inventive subject matter, the lateral surface of the screw has a recess or a taper. The screw, which is situated in a channel-shaped recess of the cutting body, for example, is preferably provided with a taper, which is provided around the entire circumference in the dovetail-shaped area. This taper allows a preferably free flow of coolant from the cooling duct of the holder via the clamping screw to the cutting body. The number of the tapers or the recesses is adapted, for example, to the cooling ducts in the holder and/or the cutting edges of the cutting body. Thus, for example, each cutting edge can be supplied with coolant through one or more cooling ducts in the cutting body, for example.

The cooling ducts may also be situated so that they lead past a clamping screw, without it having to be tapered.

In some embodiments according to the present inventive subject matter, it is provided that a recess is provided in the cutting body in the area of the recess or the taper. The recess runs, beginning from the taper or recess, for example, on the screw in the direction of a free surface behind a cutting edge of the cutting body and opens there into an opening. The coolant can flow, starting from the coolant duct in the holder via the taper or recess on the screw in the recess in the cutting body up to the opening on the free surface onto the cutting surface.

In addition, in some embodiments according to the present inventive subject matter, the holder is designed for the purpose of clamping the screw (of the screw connection) at its free end using a threaded nut. The threaded nut is situated countersunk in the holder, for example. If a threaded nut is used, situating an internal thread in the holder to fasten the clamping screw can be dispensed with.

In addition, in some embodiments according to the present inventive subject matter, an inclined surface is provided on the threaded nut, which is assigned to a corresponding inclined surface of the holder. When the screw (of the screw connection) is screwed into the threaded nut, the cutting body can additionally be centered because of the interlocking inclined surfaces.

In some embodiments according to the present inventive subject matter, the cutting body is implemented as plate-like having lateral surfaces matching with the dovetail recess. The cutting body is provided with a dovetail as the cutting insert, which dispenses with additional stop surfaces for contact on lateral front faces of the holder in addition to the dovetail recess.

In addition, in some embodiments according to the present inventive subject matter, the tool is implemented having a holder having a linear clamping groove. A corresponding tool can be used, for example, for the creation of a deep hole. The holder is preferably a hollow body which is connected to at least one cutting edge using an end situated diametrically opposite to the cutting body on the clamping shaft.

In addition, in some embodiments according to the present inventive subject matter, an adapter part is provided for situating the cutting body on the holder. The adapter part has a dovetail guide for receiving the cutting body or a cutting insert. The free end of the adapter part is provided with a shoulder, for example, which can be fastened in the holder, which is implemented as a hollow body. The adapter part is preferably formed from an HSS material (high speed steel).

In this context, it is preferable that the adapter part has at least one cooling duct for conducting through coolant. Targeted guiding of a coolant via the holder up to the cutting edge of the cutting body or the cutting insert is thus possible.

BRIEF DESCRIPTION OF THE DRAWING FIGURES

Exemplary embodiments of the present inventive subject matter are shown in the drawings and are explained in greater detail hereafter with specification of further advantages and details.

DETAILED DESCRIPTION

Figure 4:
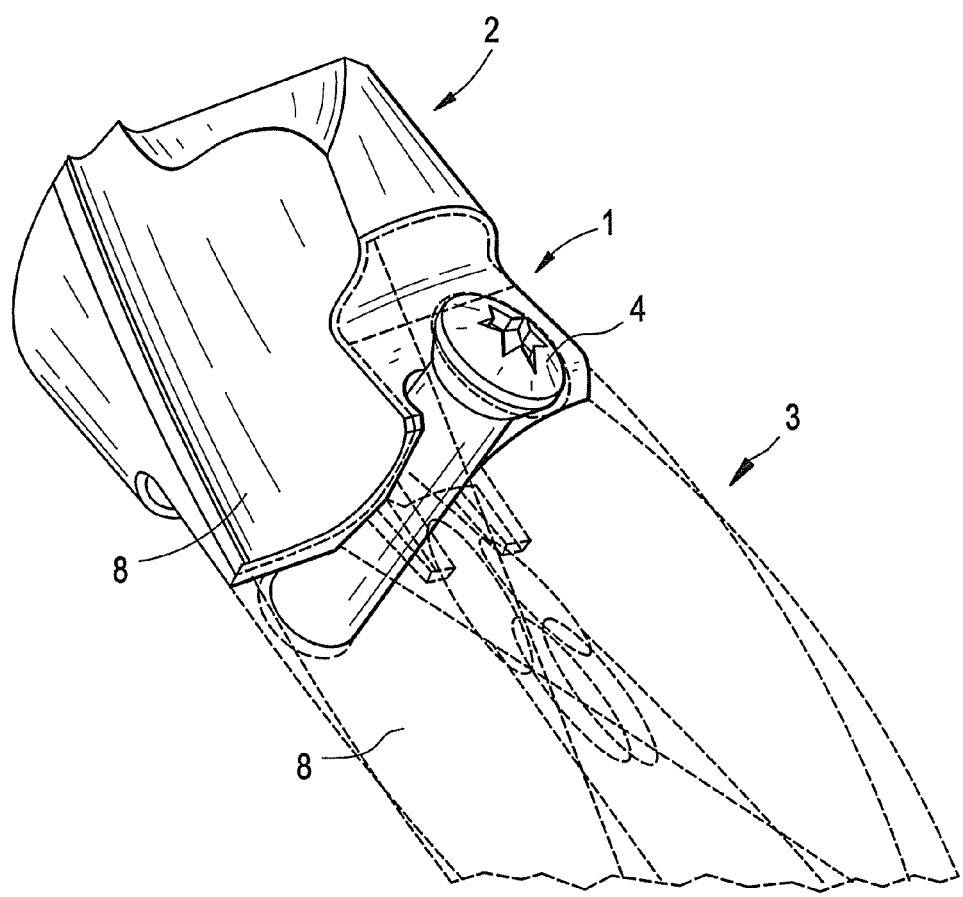
FIG. 4 shows a three-dimensional view of the forward part of a drilling tool having a cutting body, screw connection, and holder (shown transparent)

The forward section of a drilling tool 1 is shown in FIG. 4. The drilling tool 1 comprises a cutting body 2 and a holder 3, on which the cutting body 2 is fastened via a screw connection 4.

Figure 2:
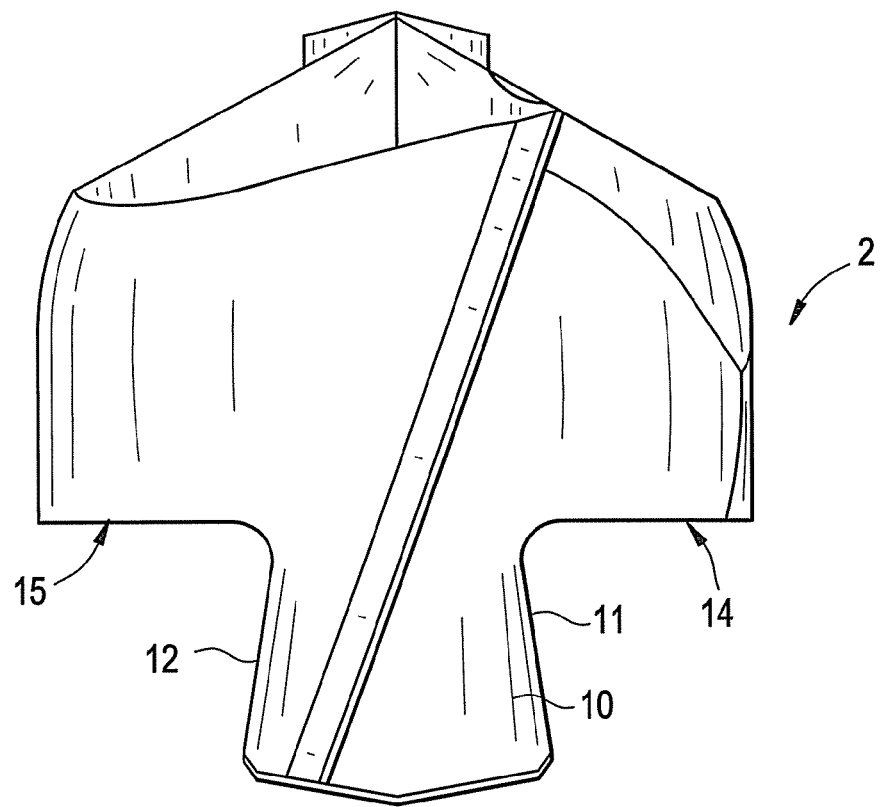
FIGS. 2 and 3 show a cutting body of a drilling tool in a side view longitudinally to an insertion direction of a dovetail extension (FIG. 2) and transversely thereto (FIG. 3)
Figure 3:
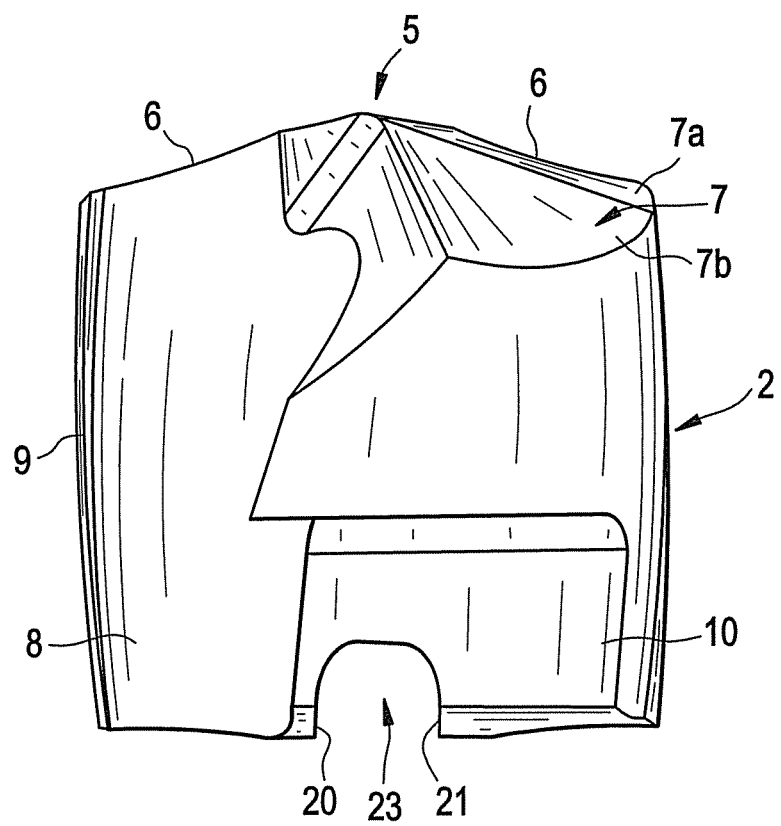

Details of the cutting body 2 are obvious in particular from FIGS. 2 and 3.

Figure 1:
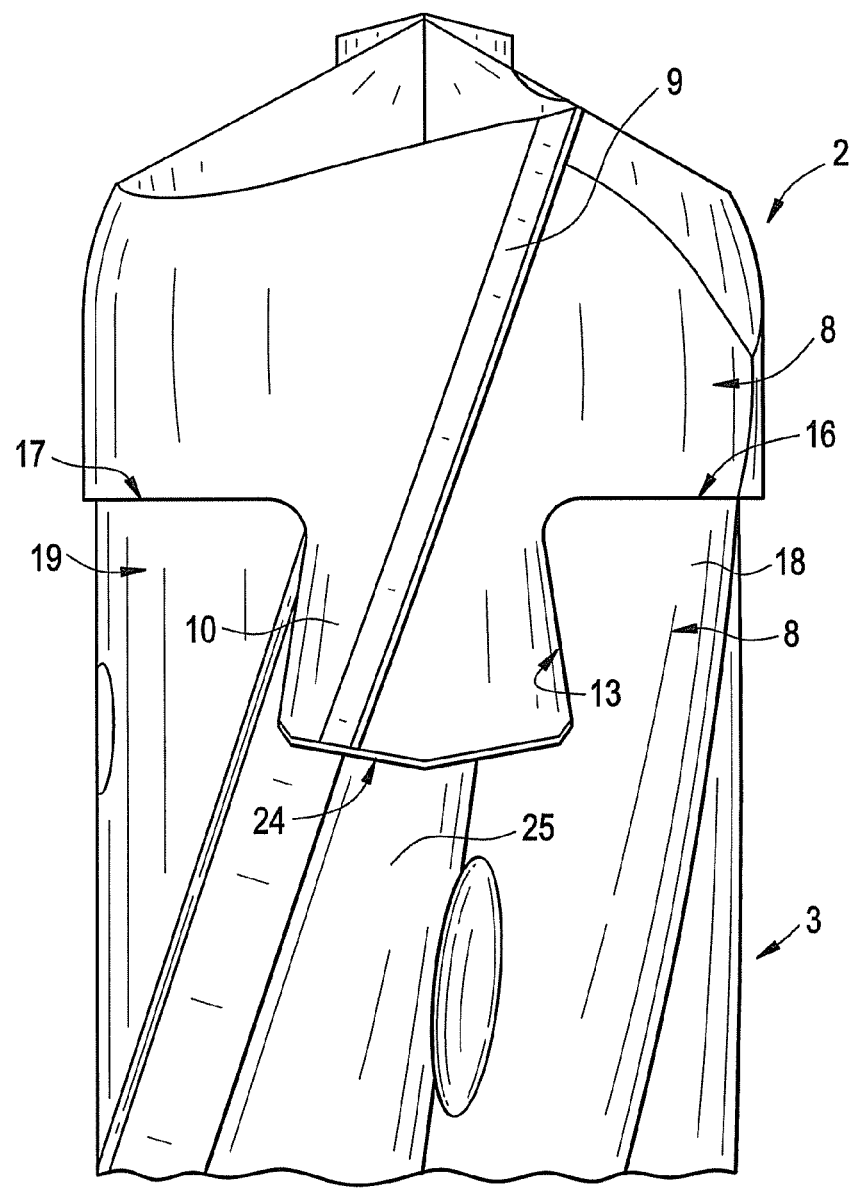
FIG. 1 shows the forward part of a drilling tool according to the present inventive subject matter in a side view.

The drilling tool 1 is shown without the screw connection 4 in FIG. 1.

The cutting body 2 comprises a drill tip 5, from which two main cutting edges 6 originate, each of which is adjoined by a free surface 7 opposite to the cutting direction of the main cutting edges 6. The free surface 7 comprises two partial surfaces 7a and 7b, the partial surface 7b having a greater free angle than the partial surface 7a. Furthermore, clamping grooves 8 are provided, which are each delimited by a secondary cutting edge 9 on the peripheral outer side of the drilling tool 1.

The clamping grooves 8 run in a spiral and continue in the main body 3.

A dovetail part 10 is implemented on the cutting body 2, having flanks 11, 12 tapering toward one another toward the drill tip 5.

A recess 13 matching thereto is provided in the holder 3.

The cutting body 2 has stop surfaces 14, 15, which lie in a plane perpendicular to the longitudinal axis of the drilling tool 1 and are adapted to stop surfaces 16, 17 matching thereto on flank sections 18, 19 of the recess 13. Correspondingly, the stop surfaces 16, 17 also lie in a plane which extends perpendicularly to the longitudinal axis of the drilling tool 1. The stop surfaces 16, 17 form the forwardmost frontal end area of the end sections 18, 19 of the recess 13.

The cutting body 2 may thus be inserted laterally along the flanks 11, 12 of the dovetail-shaped area 10 into the recess 13. In this manner, the dovetail-shaped area 10 is already centered on the axis of the drilling tool 1 in a direction transverse to the flanks 11, 12.

In the insertion direction, centering is performed by screwing in the screw of the screw connection 4, in that a middle section of the screw hits precisely worked side walls 20, 21 of a channel-shaped recess 23 in the dovetail part 10.

The screw of the screw connection 4 can rotate freely in the recess 23, but has a thread, which may be screwed into a threaded hole matching thereto in flank section 19 of the recess 13.

During the screwing in, the cutting body 2 centers itself automatically in the insertion direction of the dovetail part 10. When the screw of the screw connection 4 is completely tightened, through the wedge effect in the case of the interplay of the dovetail part 10 with the side walls 13, the cutting body 2 is drawn axially in the direction of the main body 3, so that the stop surfaces 14 and 16 or 15 and 17, respectively, are pressed against one another.

In order that the flank sections 18 and 19 deform elastically upon clamping using the screw connection 4, a slot 25 running transversely through the holder 3 is implemented in a floor 24 of the recess 13. The effective length of the flank sections is thus increased, in order to provide a greater elasticity.

Figure 5:
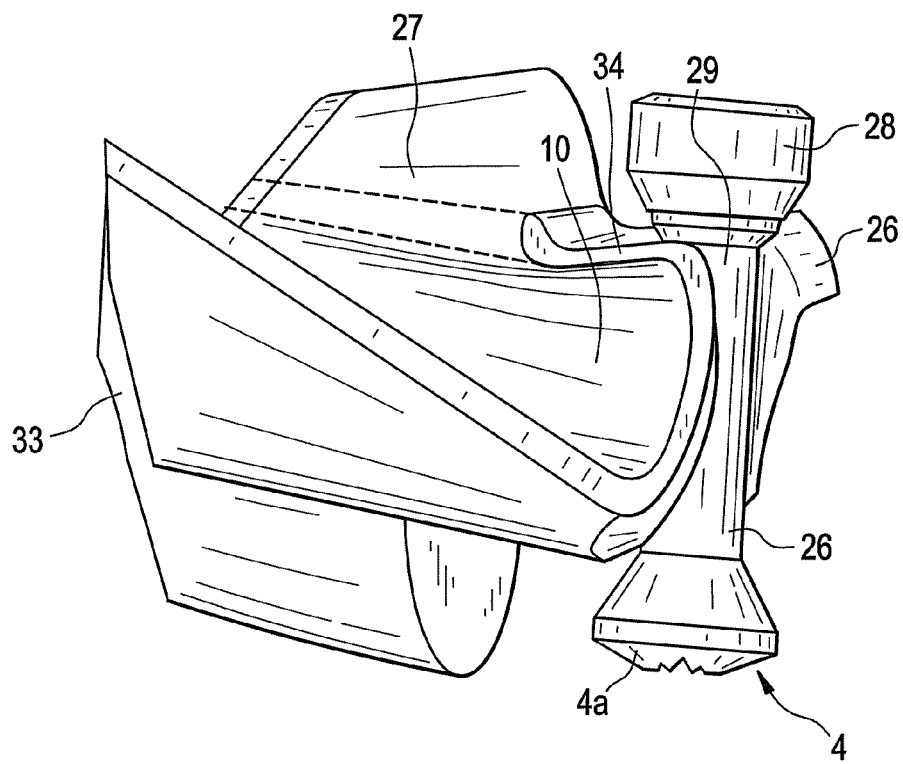
FIG. 5 shows a cutting body according to FIG. 1 having a clamping screw of a screw connection, the clamping screw having a threaded nut and a coolant guide.

A cutting body corresponding to FIG. 1 is shown in FIG. 5, which comprises a dovetail-shaped area 10, which is inserted into the assigned dovetail guide of the holder 3.

The screw connection comprises a clamping screw 4a, which is situated in the dovetail-shaped area 10 in the channel-shaped recess 23, and screwed on at its free end using a threaded nut 28. Screwing the clamping screw 4a into the threaded nut 28 clamps the two flank sections 18 and 19 of the holder 3 (see FIG. 1) against one another. The dovetail-shaped area 10 of the cutting body 2 is pressed into the dovetail recess 13 in the direction of the holder 3 and fixed. The threaded nut 28 has an inclined surface 29, which is assigned to an inclined surface in the holder 3, on its lateral surface facing toward the thread of the clamping screw 4a. The cutting body 2 can be additionally centered by screwing the threaded nut 28 onto the clamping screw 4a.

The clamping screw 4a has a recess or a taper 26 on its lateral surface, which provides a through flow of coolant when the holder 3 is additionally implemented having a coolant duct for conducting through coolant.

A recess 27 is provided in the cutting body 2 in the area of the recess or taper 26, which creates a connection from the recess or taper 26 of the clamping screw 4a up to an opening 33 exiting in the free surface 7. Because of the dovetail-shaped area 10, the recess 27 in the cutting body is implemented in the area of the flanks 11 and 12 like a recess channel 34.

Figure 6:
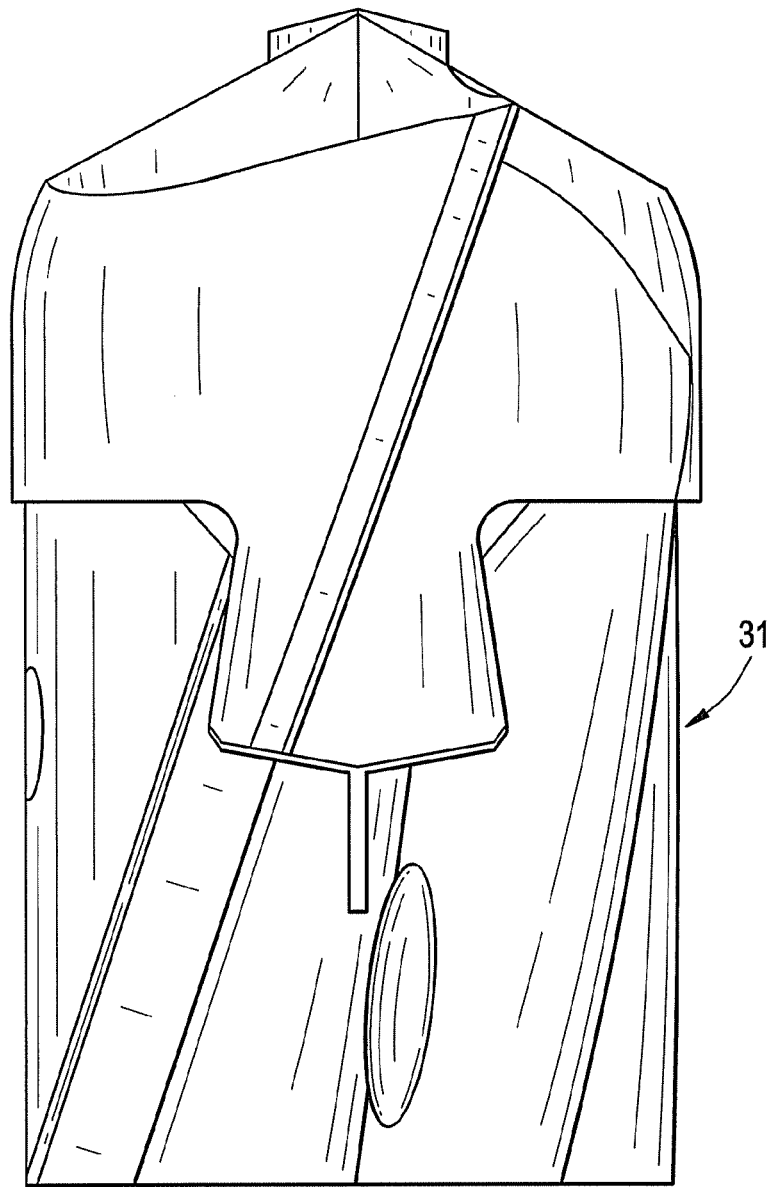
FIG. 6 shows an adapter part in a three-dimensional view.

An adapter part 31 is shown in FIG. 6, whose shape simulates that of the frontal attachment area of a holder 3 (shown in FIG. 1) for receiving a cutting body 2. The adapter part 31 forms an adapter between the cutting body 2 and the holder 3 if the holder is implemented as a hollow body, for example. It is conceivable that the adapter part 31 has a radial shoulder on the lateral surface directed toward the holder 3, for example, which is provided for inserting the adapter part 31 into the holder 3. Such a tool is suitable, for example, for producing deep holes.

Figure 7:
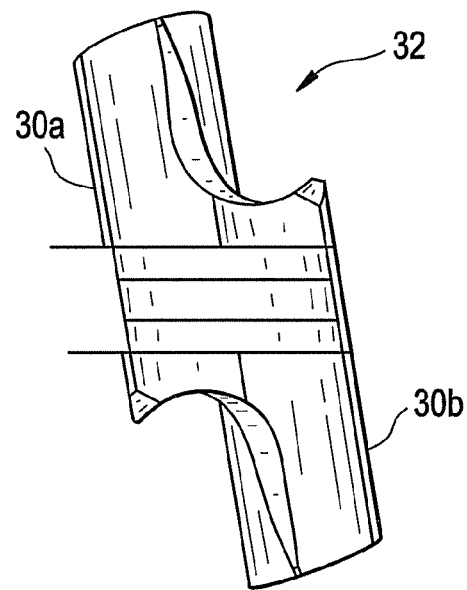
FIGS. 7 and 8 show a cutting body according to FIG. 1, implemented as a cutting insert, in top and side views.
Figure 8:
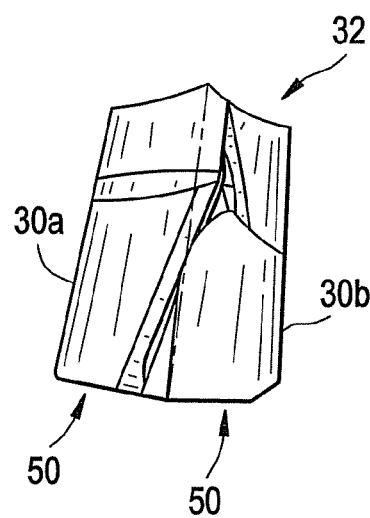

In each of FIGS. 7 and 8, a cutting body 2 is shown which is implemented as a plate-like cutting insert 32. The cutting insert 32 has lateral surfaces 30a and 30b matching with the dovetail recess 13. The cutting body 2 dispenses with laterally protruding stop surfaces, such as the stop surfaces on the front side 16 and 17 of the cutting body 2. A stop occurs on the base of the dovetail recess on the stop surfaces 50, for example.

Figure 9:
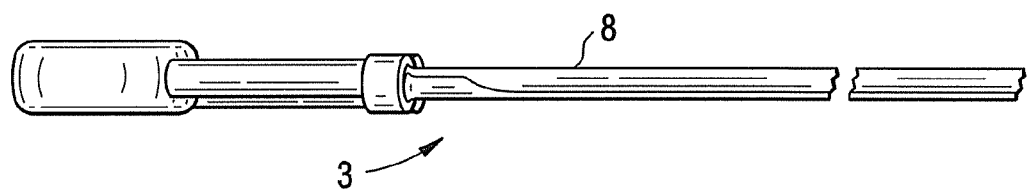
FIG. 9 shows a holder having linear clamping groove in a three-dimensional view.

A holder 3 is shown in FIG. 9, which is implemented comprising a hollow body section and has a linear clamping groove 8 on the lateral surface. Situating a cutting body 2 or a cutting insert 32 is possible using the adapter part 31 according to the present inventive subject matter as per FIG. 6.

The invention claimed is:

1. A rotary-driven tool for cutting machining, the rotary-driven tool comprising:
   a cutting body comprising at least one cutting edge, at least one stop surface, and a dovetail-shaped area; and
   a holder comprising a shaft part and a dovetail recess, the dovetail recess matching the dovetail-shaped area,
   the cutting body and the matching dovetail recess being adapted to one another in such a manner that the cutting body can only be inserted into the holder laterally to a longitudinal axis of the holder, the dovetail recess comprising diametrically opposing flank sections, between which the dovetail-shaped area is intended to be situated, the diametrically opposing flank sections of the dovetail recess being movable toward one another via a screw connection in the holder to fix the cutting body, the screw connection comprising a clamping screw, the clamping screw situated in a channel-shaped recess of the cutting body, the cutting body experiencing a force in the axial direction upon fixing by the screw connection, the cutting body comprising a cutting head, the force in the axial direction being exclusively provided by the dovetail-shaped area in cooperation with the dovetail recess in the holder, the dovetail-shaped area protruding as an extension directly from the stop surface at an outermost diameter of the stop surface.

2. A tool as recited in claim 1, wherein the stop surface is a frontal stop surface of the cutting body, and the dovetail-shaped area adjoins the frontal stop surface.

3. A tool as recited in claim 1, wherein the dovetail-shaped area is adapted to the dovetail-shaped recess in such a manner that the force in the axial direction in the clamped state of the cutting body presses the stop surface of the cutting body against front sides of the flank sections of the dovetail recess.

4. A tool as recited in claim 1, wherein a recess in the dovetail-shaped area is adapted to a screw of the screw connection, which is guided in the holder, in such a manner that in addition to location fixing by an insertion of the dovetail into the dovetail recess, centering occurs in the insertion direction of the cutting body on the rotational axis of the tool via the screw.

5. A tool as recited in claim 4, wherein a lateral surface of the screw has a screw recess or a taper.

6. A tool as recited in claim 5, wherein a recess is provided in the cutting body in the area of the screw recess or taper.

7. A tool as recited in claim 1, wherein the dovetail recess is channel-shaped.

8. A tool as recited in claim 1, wherein the holder comprises at least one cooling duct, the cooling duct having an opening on the front side or die holder, the opening facing toward the cutting body.

9. A tool as recited in claim 1, wherein the cutting body is plate-like and has lateral surfaces matching with the dovetail recess.

10. A tool as recited in claim 1, wherein the screw connection comprises a threaded nut screwed onto an end of the clamping screw.

11. A tool as recited in claim 1, wherein the channel-shaped recess extends perpendicularly through the sidewall.

12. A tool as recited in claim 1, wherein the channel-shaped recess extends a fraction of a length from a peripheral surface of the cutting body to an axis of the cutting body.

13. A tool as recited in claim 1, wherein the channel-shaped recess is aligned so that an extension of the channel-shaped recess through the cutting body would extend through an axis of the cutting body.

14. A tool for cutting machining, the tool comprising:
a cutting body comprising at least one dovetail-shaped area;
a holder comprising a shaft part and a dovetail recess comprising diametrically opposing flank sections;
a screw connection comprising a screw; and
at least a cutting edge;
said cutting body dovetail-shaped area and said dovetail recess being shaped such that the cutting body dovetail-shaped area and the dovetail recess fit into one another, said screw connection being configured to physically contact the cutting body to provide a three in an axial direction of said tool, said screw connection being configured to center the cutting body on a rotational axis in an insertion direction of the cutting body.

15. A tool as recited in claim 14, wherein said cutting body comprises a frontal stop surface, said dovetail-shaped area adjoining said frontal stop surface.

16. A tool as recited in claim 15, wherein said dovetail-shaped area protrudes as an extension out of said frontal stop surface.

17. A tool as recited in claim 15, wherein said screw connection is operable to press said frontal stop surface against a front side of said dovetail recess flank sections.

18. A tool as recited in claim 14, wherein said dovetail-shaped area comprises a recess; and wherein said screw is guided in such a manner that centering occurs in the insertion direction of the cutting body on the rotational axis of the tool.

19. A tool as recited in one claim 18, wherein said dovetail-shaped area recess is channel-shaped.

20. A tool as recited in claim 14, wherein said holder comprises at least one cooling duct, the duct comprising an opening which faces toward said cutting body.

21. A tool as recited in claim 20, wherein said cooling duct continues in said cutting body.

22. A tool as recited in claim 14, wherein a lateral surface of said screw comprises at least one recess or a taper.

23. A tool as recited in claim 14, wherein said cutting body comprises a recess.

24. A tool as recited in claim 14, wherein said cutting body comprises at least two lateral surfaces.

25. A tool as recited in claim 14, wherein said cutting body is a cutting head.

26. A tool as recited in claim 14, wherein said cutting body is inserted into said holder laterally to a longitudinal axis of said holder.

27. A tool as recited in claim 14, wherein said tool further comprises a secondary cutting edge on an outer side of the tool.

28. A rotary-driven tool for cutting machining, the rotary-driven tool comprising:
a cutting body comprising at least one cutting edge and one dovetail-shaped area; and
a holder comprising a shaft part and a dovetail recess, the dovetail recess matching the dovetail-shaped area,
cutting body and the matching dovetail recess being adapted to one another in such a manner that the cutting body can only be inserted into the holder laterally to a longitudinal axis of the holder,
the dovetail recess comprising diametrically opposing flank sections, between which the dovetail-shaped area is intended to be situated, the diametrically opposing flank sections of the dovetail recess being movable toward one another via a screw connection in the holder to fix the cutting body,
the screw connection comprising a clamping screw, the clamping screw situated in a channel-shaped recess of the cutting body,
the cutting body experiencing a force in the axial direction upon fixing by the screw connection, the cutting body compromising a cutting head, the force in the axial direction being exclusively provided by the dovetail-shaped area in cooperation with the dovetail recess in the holder, at least a first point on the dovetail-shaped area is spaced from an axis of the tool a greater distance than a distance from the axis to any point of the dovetail recess.

29. A tool as recited in claim 28, wherein said tool further comprises a secondary cutting edge on an outer side of the tool, the secondary cutting edge extending across the dovetail-shaped area.

30. A tool as recited in claim 28, wherein the first point on the dovetail-shaped area is spaced from the axis of the tool at least as far as any point on the cutting body.

31. A rotary-driven tool for cutting machining, the rotary-driven tool comprising:

a cutting body comprising at least one cutting edge, at least one stop surface, and one dovetail-shaped area; and a holder comprising a shaft part and it dovetail recess, the dovetail recess matching the dovetail-shaped area, the cutting body and the matching dovetail recess being adapted to one another in such a manner that the cutting body can only be inserted into the holder laterally to a longitudinal axis of the holder.

the dovetail recess comprising diametrically opposing flank sections, between which the dovetail-shaped area is intended to be situated, the diametrically opposing flank sections of the dovetail recess being movable toward one another via a screw connection in the holder to fix the cutting body, the screw connection comprising a clamping screw, the clamping screw situated in a channel-shaped recess of the cutting body, the cutting body experiencing a force in the axial direction upon fixing by the screw connection, the cutting body compromising a cutting head, the force in the axial direction being exclusively provided by the dovetail-shaped area in cooperation with the dovetail recess in the holder, the channel-shaped recess extending at least 180 degrees around a circumference of the clamping screw.

* * * * *

UNITED STATES PATENT AND TRADEMARK OFFICE
CERTIFICATE OF CORRECTION

| | |
|---|---|
| PATENT NO. | : 8,992,136 B2 |
| APPLICATION NO. | : 12/908247 |
| DATED | : March 31, 2015 |
| INVENTOR(S) | : Markus Klettenheimer and Uwe Schlagenhauf |

It is certified that error appears in the above-identified patent and that said Letters Patent is hereby corrected as shown below:

In the claims,

Claim 8, Col. 7, Line 41

Please change: "on the front side or die holder, the opening facing toward the" to -- on the front side of the holder, the opening facing toward the --

Claim 14, Col. 8, Lines 1-3

Please change: "said screw connection being configured to physically contact the cutting body to provide a three in an axial direction of said tool," to -- said screw connection being configured to physically contact the cutting body to provide a force in an axial direction of said tool, --

Claim 28, Col. 8, Line 47

Please change: "cutting body and the matching dovetail recess being" to -- the cutting body and the matching dovetail recess being --

Claim 28, Col. 8, Line 62

Please change: "compromising a cutting head, the force in the axial" to -- comprising a cutting head, the force in the axial --

Claim 31, Col. 9, Line 15

Please change: "a holder comprising a shaft part and it dovetail recess, the" to -- a holder comprising a shaft part and a dovetail recess, --

Signed and Sealed this
Twenty-fourth Day of November, 2015

Michelle K. Lee
*Director of the United States Patent and Trademark Office*

CERTIFICATE OF CORRECTION (continued)

U.S. Pat. No. 8,992,136 B2

Claim 31, Col. 9, Line 19

Please change: "longitudinal axis of the holder." to -- longitudinal axis of the holder, --

Claim 31, Col. 10, Line 12

Please change: "compromising a cutting head, the force in the axial" to -- comprising a cutting head, the force in the axial --